Dec. 2, 1941.   G. B. STILLWAGON, JR   2,264,727
UNIVERSAL JOINT
Filed March 22, 1940
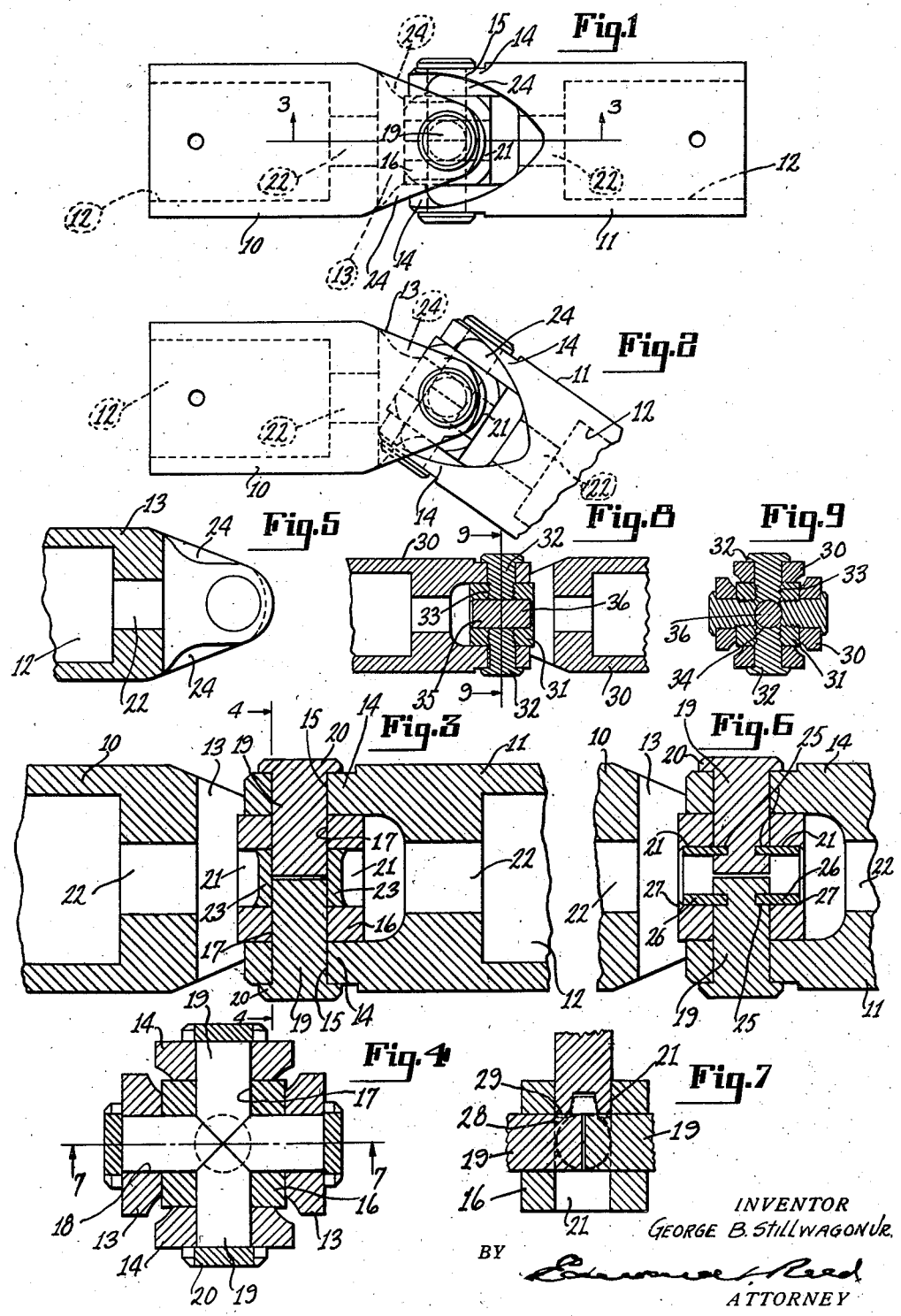
INVENTOR
GEORGE B. STILLWAGON JR.
BY
ATTORNEY Patented Dec. 2, 1941

2,264,727

UNITED STATES PATENT OFFICE 2,264,727

UNIVERSAL JOINT

George B. Stillwagon, Jr., Dayton, Ohio, assignor of one-half to Kenneth G. Fraser, Dayton, Ohio Application March 22, 1940, Serial No. 325,427

2 Claims. (Cl. 64—17)

This invention relates to a universal joint and one object of the invention is to provide a universal joint of strong durable construction which can be manufactured and assembled at a relatively low cost.

A further object of the invention is to provide a universal joint which will have a strength large in proportion to its weight and will be of balanced design to substantially equalize the forces and stress transfers.

A further object of the invention is to provide a universal joint of such a character that pivot members of substantially the same size may be inserted therein without weakening any of the pivot members, and which will minimize the bending forces on the pivot members and jaws.

A further object of the invention is to provide such a universal joint which will be capable of a relatively large pivotal movement.

Other objects of the invention may appear as the device is described in detail.

In the accompanying drawing Fig. 1 is a plan view of a universal joint embodying my invention, showing the coupling members in alinement; Fig. 2 is a similar view showing the coupling members in angular relation one to the other; Fig. 3 is a longitudinal section taken on the line 3—3 of Fig. 1; Fig. 4 is a transverse section taken on the line 4—4 of Fig. 3, looking in the direction of the arrows; Fig. 5 is a plan view of the inner surface of a portion of one of the jaws; Fig. 6 is a sectional view similar to Fig. 3 but showing modified means for locking the pivot members; Fig. 7 is a transverse section, taken on the line 7—7 of Fig. 4, showing a modified form of locking device; Fig. 8 is a longitudinal section, taken on the line 3—3 of Fig. 1, showing still another form of locking device; and Fig. 9 is a transverse section taken on the line 9—9 of Fig. 8.

In this drawing I have illustrated the preferred embodiment of the invention, together with a minor modification thereof, but it will be understood that the joint may take various forms without departing from the spirit of the invention.

In that form here illustrated the joint comprises two members, 10 and 11, adapted to be secured to shafts or other parts which are to be connected by the joint, and herein called coupling members. The coupling members may be attached to the shafts or other parts, which are to be connected by the joint, in any suitable manner and, as here shown, each coupling member is provided at its outer end with a recess 12 to receive the end of a shaft or the like. At its other or inner end each member is provided with laterally spaced jaws, 13 and 14, and the jaws of the two members are arranged in intersecting planes. In the particular arrangement here illustrated each jaw has a flat inner surface and the jaws of each member are arranged in planes extending at right angles to the planes of the other member. Each jaw is provided near its outer end with an opening 15 adapted to receive one end of a pivot member, these openings being referred to as bearing openings.

Interposed between the jaws of both coupling members is a connecting member 16, which may be of any suitable shape but is preferably in the form of a substantially square block which is provided with intersecting bores 17 and 18, the bores intersecting adjacent the center of the block and each of the bores being alined with the bearing openings 15 of one pair of jaws. The connecting block 16 is connected with the jaws of the two coupling members by pivot members 19 and separate pivot members extend through the bearing openings of the respective jaws and into the corresponding bores. Each pivot member is here shown as a pin having on its outer end a hub 20 to engage the outer surface of the jaw through which the pin extends, and the inner ends of the pins terminate adjacent the intersection of the bores 17 and 18. Suitable means are provided for retaining the pivot members or pins in their assembled positions and this is preferably accomplished by connecting the inner ends of the pins one to the other. This connection may be established in various ways but I have here shown the connecting block 16 as having openings 21 in substantially longitudinal alinement with the respective coupling members, when said coupling members are in alinement one with the other, and communicating with the bores 17 and 18 at the intersection of the latter, thus providing means whereby the connecting means may be applied to the inner ends of the pivot pins.

In the forms shown in Figs. 1 to 7 the inner ends of the pins are so shaped that the inner ends of the several pins will be in overlapping relation in the intersection of the two bores 17 and 18. Preferably the inner end of each pin is beveled on both sides to provide the same with a tapered end portion which will extend between the tapered end portions of the two other pins. By beveling each side of the pin at an angle of approximately forty-five degrees the inner ends of the pins may be caused to have a full and direct contact one with the other, as shown in Fig. 4, although it is not essential that the pins should be in contact one with the other, and it may be desirable to arrange the same out of contact to simplify production. The means for locking the pins against longitudinal displacement and thus retain the same in proper relation to the other parts of the joint may take various forms and, as shown in Fig. 3, the inner ends of the pins are welded one to the other and also to the connecting block. This may be readily accomplished by inserting a welding rod through the opening 21 and fusing the welding material to the pins and block. The welding rod may be inserted through the spaces between the jaws into the opening 21 while the coupling members are in angular relation one to the other, but to facilitate the operation the coupling members are preferably provided with openings 22 leading from the recesses 12 to the spaces between the jaws, thus enabling the welding devices to be inserted longitudinally through the coupling members into the openings 21. In the welding operation I prefer to utilize an amount of welding material sufficient to build up in each opening 21 a relatively large mass 23 of that material, which adds to the strength of the joint.

The jaws 13 and 14 may be of any desired character but, as here shown, each jaw has its lateral edges converging in substantially straight lines from the respective sides of the coupling member and has its inner end rounded. In the illustrated embodiment of the invention coupling members 10 and 11 are cylindrical in form and each member is provided with a diametrical slot to form the jaws, the root portion of each jaw conforming in shape and dimensions to the lateral portion of the body of the coupling member of which it forms a part and having, at its inner side, a maximum width approximating the diameter of the coupling member. Due to the shape of the jaw and the width of its root portion with relation to the body of the coupling member it has the strength necessary to resist breaking or distortion under heavy overloads or long use. I also prefer to provide each lateral edge of the jaw, in its inner portion, with a recess 24 arranged in that part of the edge which would otherwise contact with the corresponding part of another jaw when the coupling members were moved to the limit of their pivotal movement. This permits a partial overlapping of the two jaws at those points and materially increases the angle to which one coupling member may be moved with relation to the other without causing the jaws to contact one with the other, and due to the undercut arrangement of the recesses maintaining substantially the full strength of the jaws.

In Fig. 6 I have shown a modified form of locking means for the pivot members in which a locking member is inserted in one or both the openings 21 and brought into locking engagement with the inner portions of the pivot members. In the arrangement shown, the inner portions of each pivot member or pin is provided with a recess 25, which may be formed by inserting a hollow mill in the openings 21 and forming the recesses in the pivot members while the latter are held firmly in their assembled positions. After the recesses have been formed a tubular locking element 26 is inserted in each opening with its inner edge extending into the recesses 25, thereby positively locking the pivot members one to the other and to the connecting block. The locking elements 26 may be retained in the openings 21 by any suitable means and, as here shown, the metal of the connecting block is swedged over the end of the locking element, as shown at 27.

In Fig. 7 there is illustrated another means for retaining the pivot members in the bores of the connecting block, in which the pivot members have been deformed to cause portions of the metal thereof to enter the spaces at the corners of the substantially square opening formed at the intersection of the two bores, as shown at 29, and thus hold the pivot members against outward movement. This may be accomplished by inserting in the opening 21 a swedging tool, preferably having an annular contact edge, and by a blow or by pressure causing the tool to distort the several pivot members and cause portions 28 thereof to flow into the spaces 29, thus connecting the pivot members with the connecting block and with one another.

In Figs. 8 and 9 there is shown another modification of the means for locking the pivot members. The coupling members 30 may be of any suitable character and, as here shown, are similar to those shown in Figs. 1 to 4. The connecting block 31 is provided with intersecting bores to receive the pivot members 32 but in this instance the pivot members are screw threaded into the respective bores, as shown at 33. The pivot members, or pins, 32 are of such length that when fully inserted the inner end of each pivot member will extend slightly beyond the arcuate wall of the intersecting bore. After the pivot members have been inserted and while they are held against movement the inner ends thereof are provided with transverse recesses 34, preferably by passing a boring tool or the like through the transverse opening 35 in the connecting block and between the ends of the pivot members, thus forming the recesses parallel one with the other and in line with the opening 35. A locking pin 36 is then inserted in the recessed ends of the several pivot members to hold each pivot member against rotation in the block and thus prevent is longitudinal displacement. The ends of the locking pins preferably lie in the opening 35 and may be retained therein by inserting the same with a pressed fit or by swedging the metal of the block into the ends of the opening 35, or by using both methods. The recesses may, of course, be formed in the ends of the pivot members before the latter are inserted in the connecting block but a more accurate adjustment of the pivot members may be obtained when the recesses are formed after the pivot members have been inserted and adjusted.

While I have shown and described one embodiment of my invention, together with minor modifications thereof, I wish it to be understood that I do not wish to be limited to the details thereof as various modifications may occur to a person skilled in the art.

Having now fully described my invention, what I claim as new and desire to secure by Letters Patent, is:

1. In a universal joint, two coupling members arranged end to end and each having a pair of transversely spaced jaws in planes intersecting the planes of the jaws of the other member, a connecting block interposed between the jaws of both members, and means for pivotally connecting the jaws of both members with said connecting block on intersecting axes, the jaws of each member having their inner surfaces flat and parallel one with the other throughout substantially their entire area, and each jaw having at its root a cross sectional area substantially equal to a sectional area of the body of the member of which that jaw is a part and bounded on one side by a chord line intersecting the circumference of said body in a transverse plane at the root of said jaw and in a plane parallel with the inner surface of said jaw and spaced from the longitudinal axis of said member a distance not greater than the distance between said axis and said inner surface of said jaw, said sectional area of said member being bounded on its other side by the circumference of the sector formed of said chord line, the lateral edges of each jaw converging in substantially straight lines from the root of said jaw to the plane of the pivotal axis thereof and having their inner portions recessed at the points of contact with the jaws of the other member.

2. In a universal joint, two coupling members arranged end to end and having in their adjacent ends longitudinal slots to provide the same with laterally spaced jaws, the jaws of each member being arranged in planes intersecting the planes of the jaws of the other member, a connecting block between the jaws of both members, and means for pivotally connecting said jaws with said connecting block, the slot of each member having a base of a length substantially equal to the maximum width of that member and having its side walls spaced one from the other throughout substantially their entire area a distance approximately equal to the thickness of said block, and each jaw having its lateral edges converging in substantially straight lines from the ends of the base of said slot to the plane of the pivotal axis of the member in which said slot is formed, and the root of each jaw being of a shape and dimensions corresponding substantially to the shape and dimensions of that portion of the body of said member on the adjacent side of the plane of the inner surface of said jaw, and the jaws of each member having their inner corners cut away at their points of contact with the jaws of the other member.

GEORGE B. STILLWAGON, Jr.